US00RE37674E

(19) United States
(12) Reissued Patent
Carter

(10) Patent Number: US RE37,674 E
(45) Date of Reissued Patent: Apr. 30, 2002

(54) RECYCLING TRANSPORTABLE PRESSURE WASHING SYSTEM

(75) Inventor: John A. Carter, San Jose, CA (US)

(73) Assignee: John Carter, Grants Pass, OR (US)

(21) Appl. No.: 09/414,292

(22) Filed: Oct. 6, 1999

Related U.S. Patent Documents

Reissue of:
(64) Patent No.: 5,673,715
Issued: Oct. 7, 1997
Appl. No.: 08/495,906
Filed: Jun. 28, 1995

(51) Int. Cl.[7] ..... B08B 3/02; B08B 13/00
(52) U.S. Cl. ..... 134/104.4; 134/107; 134/108; 134/111; 210/167
(58) Field of Search ..... 134/104.4, 107, 134/108, 111, 123; 210/167

(56) References Cited

U.S. PATENT DOCUMENTS

| | | | | | |
|---|---|---|---|---|---|
| 1,899,657 | A | * | 2/1933 | Zademach | 210/167 X |
| 2,352,356 | A | * | 6/1944 | Albertson | 134/109 X |
| 2,788,954 | A | * | 4/1957 | Paasche | 210/167 X |
| 2,997,048 | A | * | 8/1961 | Gertken et al. | 134/72 |
| 3,016,841 | A | * | 1/1962 | Albertson et al. | |
| 3,352,310 | A | * | 11/1967 | Doyscher | 134/56 |
| 3,444,867 | A | * | 5/1969 | Thornton | 134/123 |
| 3,971,394 | A | * | 7/1976 | Osborne | 134/111 X |
| 4,056,114 | A | * | 11/1977 | Boutillette | 134/104 |
| 4,279,263 | A | * | 7/1981 | Pulliam | 134/111 |
| 4,543,182 | A | * | 9/1985 | Gramse et al. | 134/111 X |
| 4,637,413 | A | * | 1/1987 | Llewellyn et al. | 134/111 |
| 4,818,388 | A | * | 4/1989 | Morioka et al. | 210/167 |
| 4,930,632 | A | * | 6/1990 | Eckert et al. | 206/386 |
| 5,033,489 | A | * | 7/1991 | Ferre et al. | 134/109 X |
| 5,036,976 | A | * | 8/1991 | Sechler et al. | 206/386 |
| 5,133,375 | A | * | 7/1992 | Schinzing et al. | 134/123 |
| 5,147,039 | A | * | 9/1992 | Sechler et al. | 206/386 |
| 5,167,837 | A | * | 12/1992 | Snodgrass et al. | 210/767 |
| 5,499,643 | A | * | 3/1996 | Vincent, Jr. et al. | 134/109 X |

OTHER PUBLICATIONS

"Environmental Resistance of Hyzod Polycarbonante Sheet", p. 22.*
Bytec Environmental Equipment (Bulletin), "Spilcat Capillary Absorbent Technology".*
King Bearing, Inc. (Bulletin), "ARO ¼" (Ports) Diaphragm Pump, Air–Operated Non–metallic Construction", 1993.*
Vulcan Electric Company (Bulletin), "In–Line Electric Hot Tub/Spa Heater Installation and Operating Instructions".*
Facet International (Bulletin), "Engineering Clear Solutions for Environmental Clean–up, Coalescing Plates: MPaks", 1994.*
OEM Product Information Bulletin, "Leviton's High Current GFCI", 1992.*
Extren (Bulletin), "Fiberglass Structural Shapes and Plate".*
Facet Quantek (Bulletin), "Coalescing Plate Separators for Environmental Clean–up and Resource Recovery".*
Containment Corporation (Bulletin), "Protecting Your Bottom Line".*
Metro Keystone Filter Division (Bulletin 08–B), "Filter Cartridges".*

* cited by examiner

*Primary Examiner*—Philip R. Coe
(74) *Attorney, Agent, or Firm*—Hickman Palermo Truong & Becker LLP; Christopher J. Palermo

(57) ABSTRACT

An apparatus for washing and recovering a contaminant from an object. A washing agent flows over the object, and the washing agent and contaminant are received in a basin. A slurry of the washing agent and contaminant are circulated through at least one separator and one filter to produce a cleaned slurry flow. The cleaned slurry flow is recirculated into the basin. A first pump which is used to flow the washing agent over the object has a supply port and a pressurized output port. A pressurized fluid supply is coupled to a variable regulator with a variable pressure output. A second pump driven by the variable pressure output impels the washing agent into the supply port of the first pump.

38 Claims, 6 Drawing Sheets

RECYCLING TRANSPORTABLE PRESSURE WASHING SYSTEM

Matter enclosed in heavy brackets [ ] appears in the original patent but forms no part of this reissue specification; matter printed in italics indicates the additions made by reissue.

BACKGROUND

Contamination of the environment by man-made substances has been considered a serious problem for a long time. Recently, concern about contamination of earth, air and groundwater by oil, toxic chemicals and other hazardous wastes has expanded beyond large-scale industry to encompass the activities of many small businesses such as automobile service stations, and many others. Both government regulations and social outcry have placed tremendous pressure on these businesses to avoid discharging hazardous wastes into the environment in the course of ordinary business activities.

For example, in a service station, washing or steam-cleaning an automobile engine or auto parts often causes engine oil, gasoline, and other chemicals to enter a storm drain system, or other waterways which can lead to contamination of earth or groundwater. However, until this disclosure, there has been no portable, self-contained way to conveniently and safely wash these objects and recover contaminants from them. Many other businesses and industries, large and small, have the same problems.

In addition, those who service remotely located equipment have a need to wash the equipment without discharging hazardous waste into the environment. For example, persons who service roof-mounted air conditioners containing lubricating petrochemicals, trapped pollutants or other chemicals are not permitted to wash the equipment in a manner that could cause chemicals to run off.

High pressure washing equipment is available, but in general, existing pressure washers have no containment capability for hazardous materials. They cannot prevent hazardous materials from entering the surrounding environment. Even if all the wash fluid is somehow recovered, hazardous wastes are not filtered out, so that these systems generate an enormous volume of wastewater which must be processed separately or placed in barrels for disposal.

Thus, there is a tremendous need now for a portable, zero-discharge wash apparatus which can recover oil, chemicals, and other hazardous materials from an object which is washed. In addition, there is a serious need for a wash apparatus which can recirculate and repeatedly filter the washing agent, producing a very small quantity of waste material, and for a wash apparatus which overcomes other disadvantages of the prior art, and provides other needed features.

Known pressure washing equipment has other serious disadvantages. For example, such pressure washers are ordinarily connected to a public water supply having unknown average pressure and unknown instantaneous pressure. Fluctuations in pressure of the public supply could cause damage to the pressure washer or render it usable to produce consistently high output pressure. In addition, even when the public supply has consistent pressure, its pressure may be outside an ideal operational range for the pressure washer. Thus, there is a need for a way to provide a controlled water supply to a pressure washer which is adjustable to enable an operator to achieve optimum performance of the washer.

SUMMARY

In general, in one aspect, the invention provides apparatus for washing an object containing a contaminant and for recovering the contaminant, comprising: means for flowing a washing agent over the object; a tub mounted below the object for receiving the washing agent and the contaminant; means for circulating a slurry of the washing agent and the contaminant through at least one separator in the tub; means for filtering the contaminant from the slurry to produce a cleaned slurry flow; and means for recirculating the cleaned slurry flow into the tub.

Features of the invention include means for heating the washing agent; means for enclosing the object to prevent discharge of the contaminant into a surrounding environment; a pressure wash pump coupled to a water supply and to a pressure wash wand; a plurality of baffle walls arranged to divide the tub into a plurality of fluid containment chambers and a floor overlying the tub and having at least one channel for directing the washing agent and contaminant into the fluid containment chambers; a pump having an intake coupled to the tub and having an output coupled to at least one particulate filter; and a plurality of holes and channels interconnecting the fluid containment chambers.

Further features include a pressure wash pump having an intake and an output coupled to the tub, and a pneumatic valve for selectively coupling the intake of the pressure wash pump to the cleaned slurry flow and to a fresh water source.

In another aspect, the invention provides apparatus for washing an object containing a contaminant and for recovering the contaminant, comprising a tub mounted in an enclosure around the object and comprising a plurality of fluid containment compartments; a circulating pump having an intake coupled to a first compartment and having an output coupled to a second compartment; a contaminant separator in the tub having a separation intake coupled to a third compartment and having a separation output coupled to the first compartment; and a filter having a filter intake coupled to the clean water compartment and having a filter output coupled to the tub.

Some features of this aspect include: the tub is sealed to the enclosure; a pressurized source of fluid for washing the object is provided; and a source of air for drying the object is provided.

In a further aspect, the invention comprises apparatus for washing an object containing a contaminant and for recovering the contaminant, comprising a pressure washer for flowing a washing agent over the object; a tub mounted below the object comprising a plurality of baffles which divide the tub into a plurality of fluid containment compartments; a circulating pump having an intake coupled to a clean water compartment in the tub, and having an output indirectly coupled to one of the fluid containment compartments; a contaminant separator in the tub having a separation intake coupled to one of the fluid containment compartments and having a separation output coupled to the clean water compartment; and a filter having a filter intake coupled to the clean water compartment and having a filter output coupled to the tub.

In yet another aspect, the invention provides apparatus for optimizing performance of a fluid pump having a supply port and a pressurized output port, comprising a pressurized supply of a first fluid; a variable regulator coupled to the supply having a variable pressure output; and a second pump driven by the variable pressure output for impelling a second fluid into the supply port of the fluid pump. Some features of the invention are that the first fluid is a gas and the second fluid is a liquid; that the first fluid is air; that the second fluid is a washing agent; that the second fluid is water; that the fluid pump is an electric pressure washer; that the second pump is a air-driven water pump; and that an impeller in the second pump is a diaphragm.

In still another aspect, the invention provides a method for optimizing performance of a fluid pump having a supply port and a pressurized output port, comprising the steps of providing a pressurized supply of a first fluid; variably regulating the pressurized supply to produce a variable pressure output; driving a second pump by the variable pressure output; and using the second pump to impel a second fluid into the supply port of the fluid pump.

DETAILED DESCRIPTION

Figure 1:
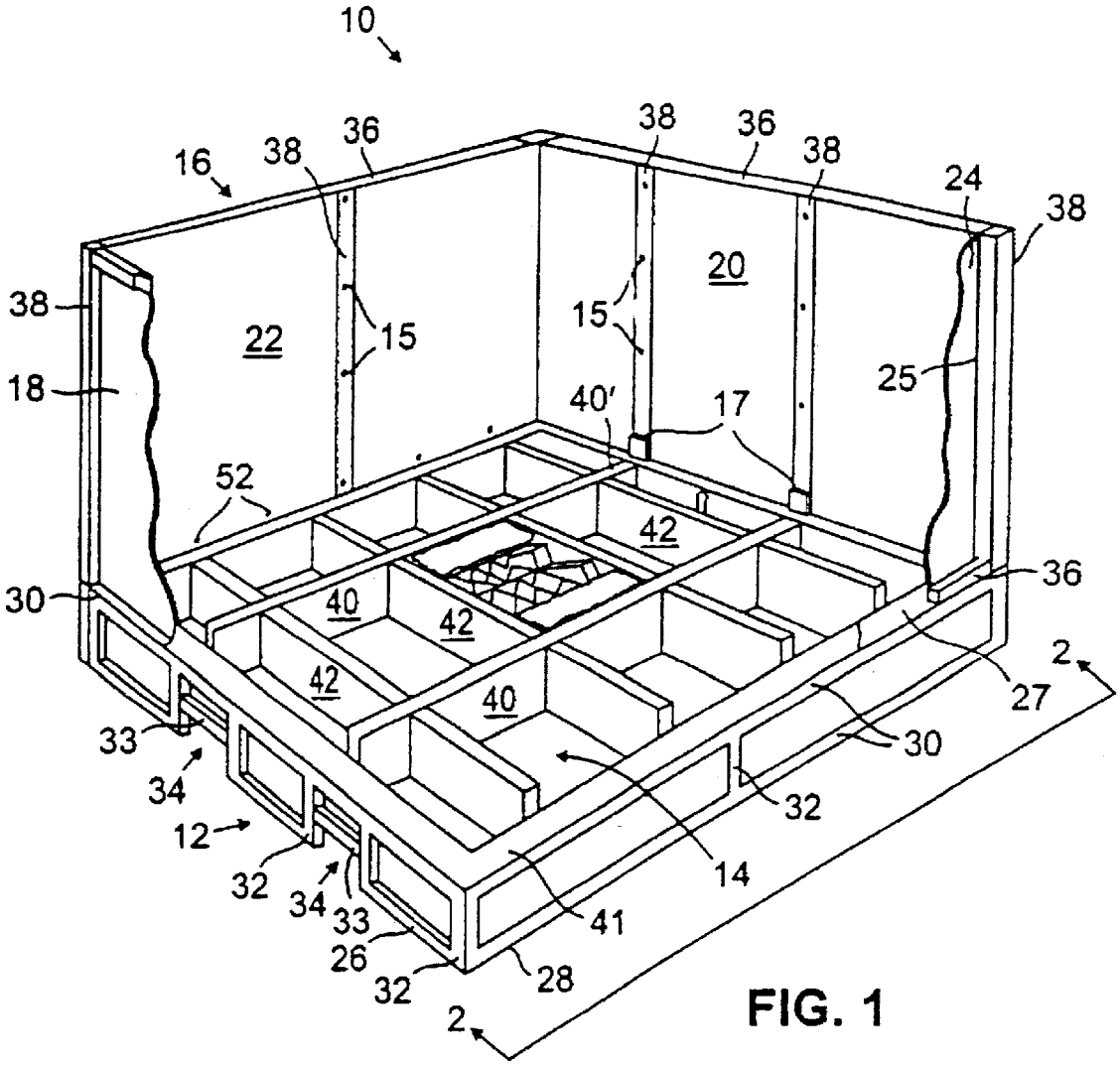
FIG. 1 is a perspective view of a washing apparatus.
Figure 2:
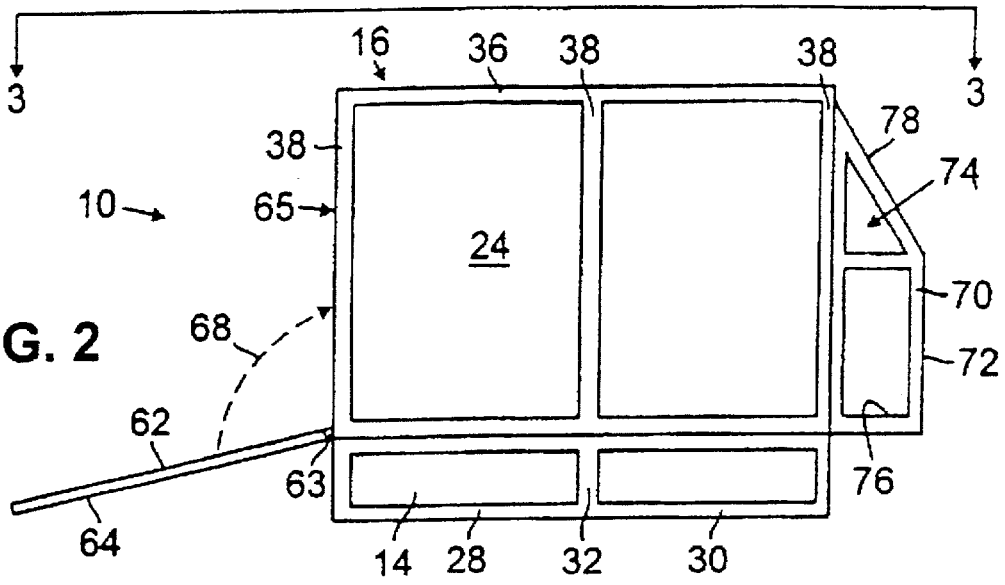
FIG. 2 is a side view of a washing apparatus.
Figure 3:
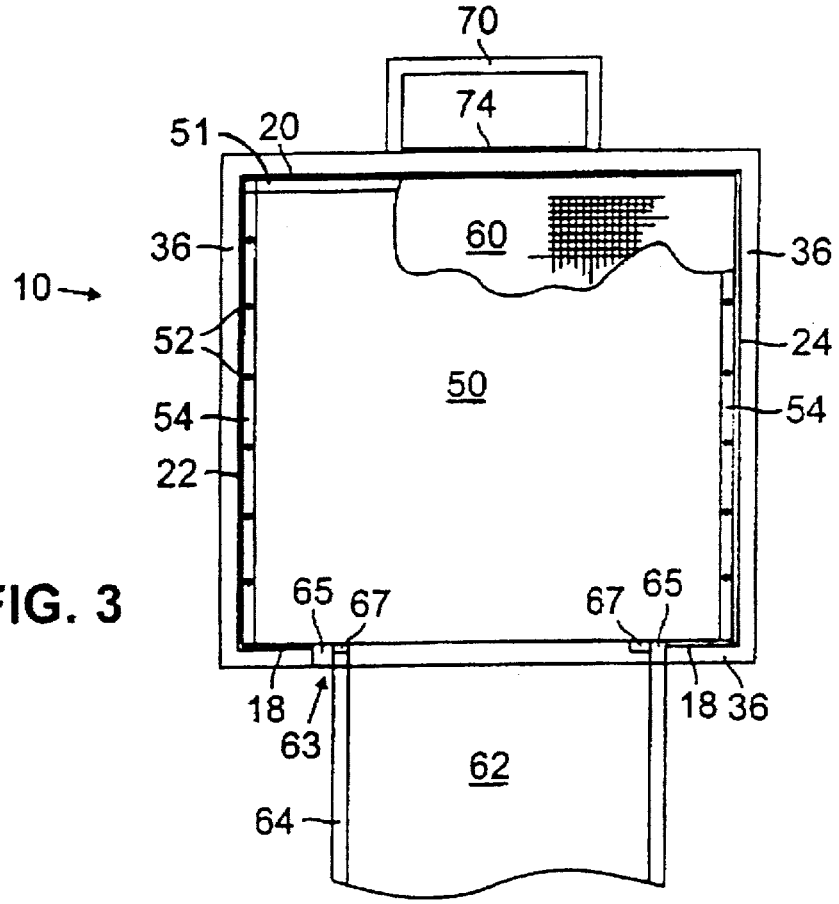
FIG. 3 is a top plan view of a washing apparatus.

FIGS. 1, 2, and 3 show a washing apparatus or wash rack 10 comprising a base frame 12, a containment tub 14, and a wall frame 16. Front and rear walls 18, 20 and left and right side walls 22, 24 are affixed to the wall frame, forming a rectangular enclosure into which an object is placed for washing. (In FIG. 1, the front wall 18 and right wall 24 are shown in cutaway, to enable details of the tub to be shown.)

The base frame 12 is a generally rectangular structure comprising four base side frames. A front base side frame 26 and a right base side frame 28 are shown in FIG. 1; similar rear and left base side frames are also provided. Each of the base side frames is formed of horizontal beams 30 joined to vertical posts 32. The beams and posts can be welded aluminum tube stock, structural fiberglass (such as EXTREN® available from MMFG and its distributors), or any other lightweight, sturdy material which is non-conductive and non-corroding.

The posts 32 are about 9-½" (20 cm) tall, so that the tub is suspended and supported in the base side frames. The front base side frame has a pair of parallel, transverse fork pockets 34 which provide clearance for the forks of a forklift or a pallet jack, enabling the entire apparatus 10 to be easily moved to a job site or any desired location. A load-bearing brace 33 extends across each fork pocket 34, the braces 33 contact the forks of a fork lift or pallet jack and bear the weight of the apparatus. The rear base frame (not visible in FIG. 1) has vertical posts affixed across the fork pocket area to prevent a fork lift operator from attempting to insert the forks of a fork lift into the rear frame. The tub has a pair of molded fork clearance channels extending rearwardly in alignment with the fork pockets in order to clear the forks. The apparatus also can be lifted to an elevated location in this manner.

The wall frame 16 similarly comprises horizontal beams 36 and vertical posts 38 arranged in a rectangular upright structure. As shown in FIG. 1, the beams and posts forming the wall frame 16 are welded aluminum tube stock, structural fiberglass or other lightweight, strong material.

The wall frame is made in detachable left, right, front and rear wall sections so that the frame can be collapsed into a stack for shipping atop the tub and base frame. The beams and posts have threaded fasteners for securing the wall sections to each other and to the base frame, to form a sealed enclosure which prevents contaminants washed off an object from entering the surrounding environment. Use of threaded fasteners also allows the apparatus to be disassembled into flat wall sections which can be stacked in compact fashion for shipment, permits one person to assemble the apparatus by eliminating nuts, and eliminates water leakage paths which would occur if through-bolt holes were used.

Gaskets 25 are secured to the wall posts and the base frame to ensure a tight seal between the base frame and the wall sections. The gaskets can be foam tape or other resilient material running the length of the posts and beams.

Walls 18, 20, 22, and 24 are secured to the wall frame 16 with screws 15. The walls are HYZOD® polycarbonate sheet or an equivalent material which is non-conductive and generally impervious to attack by oil, solvents, and other hazardous materials. The walls are about 40"(1 m) high, or any other height which adequately contains the spray of a washing agent within the walls, but also allows an operator to reach over or lean into the apparatus to wash an object. The walls are made sufficiently high to prevent an operator from falling out of the apparatus when working inside it.

The walls are made of transparent material so that an operator can see through them to steer the apparatus when it is on a forklift, pallet jack or other moving equipment.

The tub 14 can be a molded high-density polypropylene basin, or an equivalent sealed pool or basin with high perimeter walls strong enough to contain water. Since the tub 14 itself cannot carry a heavy load placed on it, the tub 14 has a plurality of load-bearing longitudinal beams or walls 40 and a plurality of lateral beams or walls 42.

A secondary containment tub can be provided either within or outside the tub 14 to provide extra security against spillage of hazardous materials.

Figure 4:
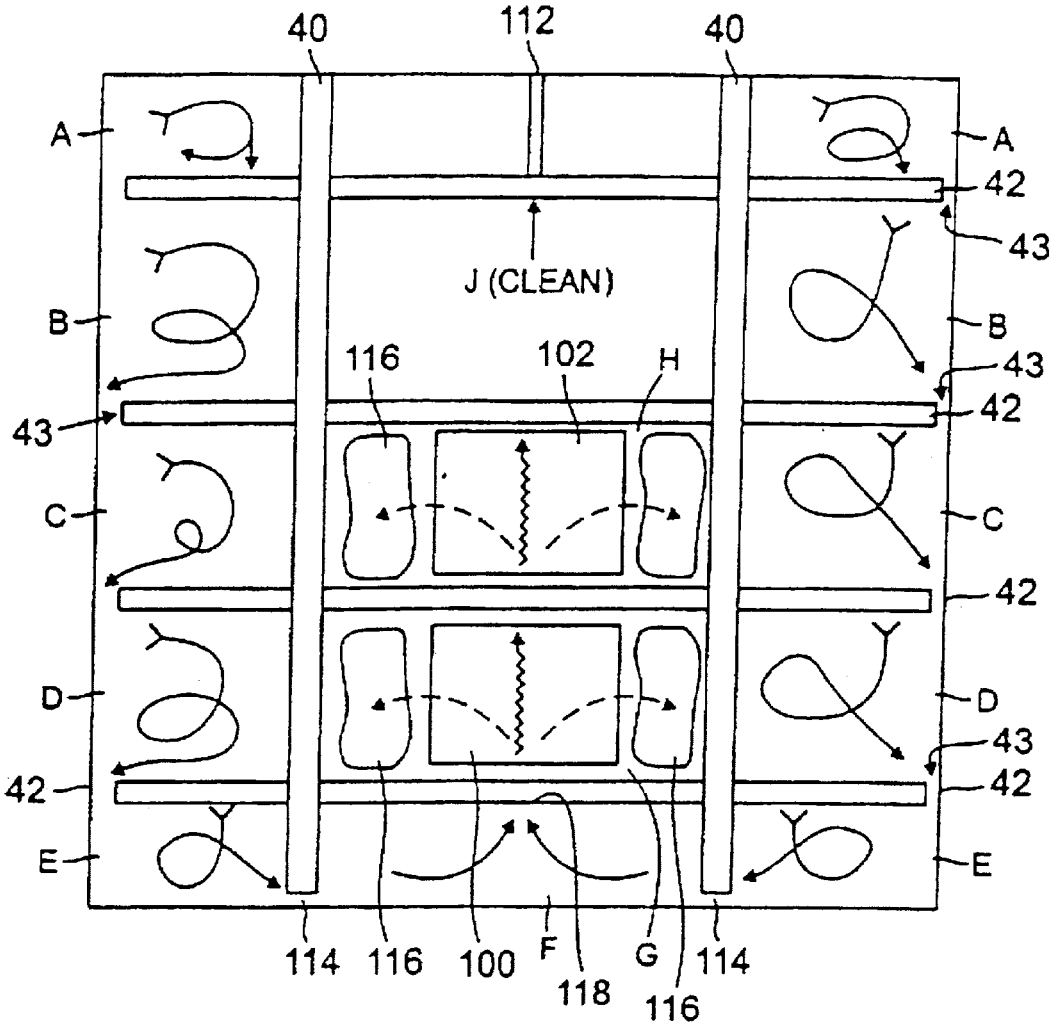
FIG. 4 is a top view of fluid flow paths.

The beams 40, 42 snugly interlock so that fluid cannot cross the beams unless a hole is provided in the beam, thus subdividing the tub into a plurality of containment compartments designated A through J in FIG. 4. When an object is washed with a washing agent in the apparatus, the tub and its containment compartments receive the washing agent and any hazardous materials washed off the object. The tub has flanges 41 around its perimeter which extend over and rest on the beams 30 of the base frame. The lower beams 36 of the side walls rest on a tub gasket 27 and on the flanges, and are fastened to the beams 30 using threaded fasteners, forming a sealed sandwich which prevents release of contaminants.

The tub and supporting beams may comprise a modified containment system such as the CONTAIN-IT PLUS available from Containment Corporation, Los Alamitos, Calif., USA, or the type shown in Eckert U.S. Pat. No. 4,930,632 or 5,036,976. Such containment systems are intended for spill containment of palletized barrels of hazardous material, but not for use in a washing apparatus. This type of containment system must be modified to be used in the apparatus of this disclosure, e.g., by making holes in the beams to permit water to flow between containment compartments, by adding inlets and outlets, by removing a downward, hanging lip on the perimeter of the tub, and by making other necessary changes described below.

As shown in FIG. 3, a subfloor 50 rests atop the beams 40, 42. The subfloor is held spaced apart from the walls 18, 20, 22, 24 by a plurality of spacers 52 affixed to the lower inside face of the walls 18, 20, 22, 24. Thus, a narrow gap 54 of about ⅜" (8 mm) is provided on all sides of the subfloor to enable washing fluid and debris to flow into the tub 14. The subfloor rests flat on the beams 40, 42 to provide a solid walking surface, and to help reduce heat loss when the water is in a heated state.

A stabilizing bar 51 extends across the rear edge of the subfloor 50. The bar 51 transfers the weight of the apparatus to the cleats 17 when the apparatus is lifted. The tub has little compressive strength, whereas the beams 40, 42 and the frame can carry substantial weight. To aid in transferring the weight of the apparatus to the frame, a pair of cleats 17 are secured to the rear wall frame through the rear wall 20. When the apparatus is lifted, and when a heavy object is placed in the apparatus, weight is transferred from the beams to the bar 51 and then to the cleats. In particular, upward pressure by the rear ends 40' of the beams 40 is exerted on the cleats 17 and thereby is transferred to the rails 36, posts 38, and the base frame. In short, the cleats 17 effectively bear and transfer all the weight of the tub, the beams 40, 42, and any water in the tub to the frame.

The subfloor 50 is removable to provide access to the tub 14. The subfloor is a non-conductive, rigid material such as fiberglass or a composite material.

A non-conductive, non-skid floor mat 60 lies on the subfloor 50 to slightly elevate the object being washed, and anyone standing in the apparatus, above the subfloor. This causes wash fluid to collect below the floor mat, preventing pooling and reducing spray reflection during pressure washing. Thus, the floor mat 60 helps prevent hazardous materials from splashing out of the apparatus and generally improves the safety of the operator. The floor mat may be made from FLEXMAT molded grating or an equivalent pliable, non-skid matting.

A ramp 62 is hinged to the base frame between the front walls 18. The ramp comprises a ramp wall 66 affixed to a welded frame of beams 64. Holes 63 ride on axles (not visible) protruding inwardly from posts 65, to enable hinged movement of the ramp 62. Other types of heavy duty hinges can be used. The ramp can be folded down, as shown in FIG. 2, to enable heavy objects to be rolled into the apparatus or to hand carry objects into the apparatus. As shown by arrow 68, before an object is washed, the ramp is moved upward and rests against flanges 67 protruding from posts 65 of the front wall frame 16 adjacent the front wall 18. The ramp is held in place by two latches. The ramp is covered with a subfloor and non-skid grating like those used over the tub 14.

Figure 5:
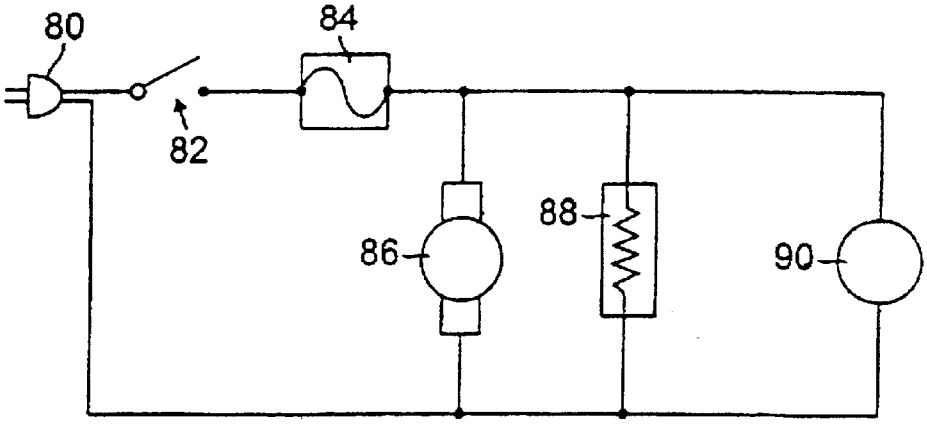
FIG. 5 is a schematic diagram of electric components.
Figure 6:
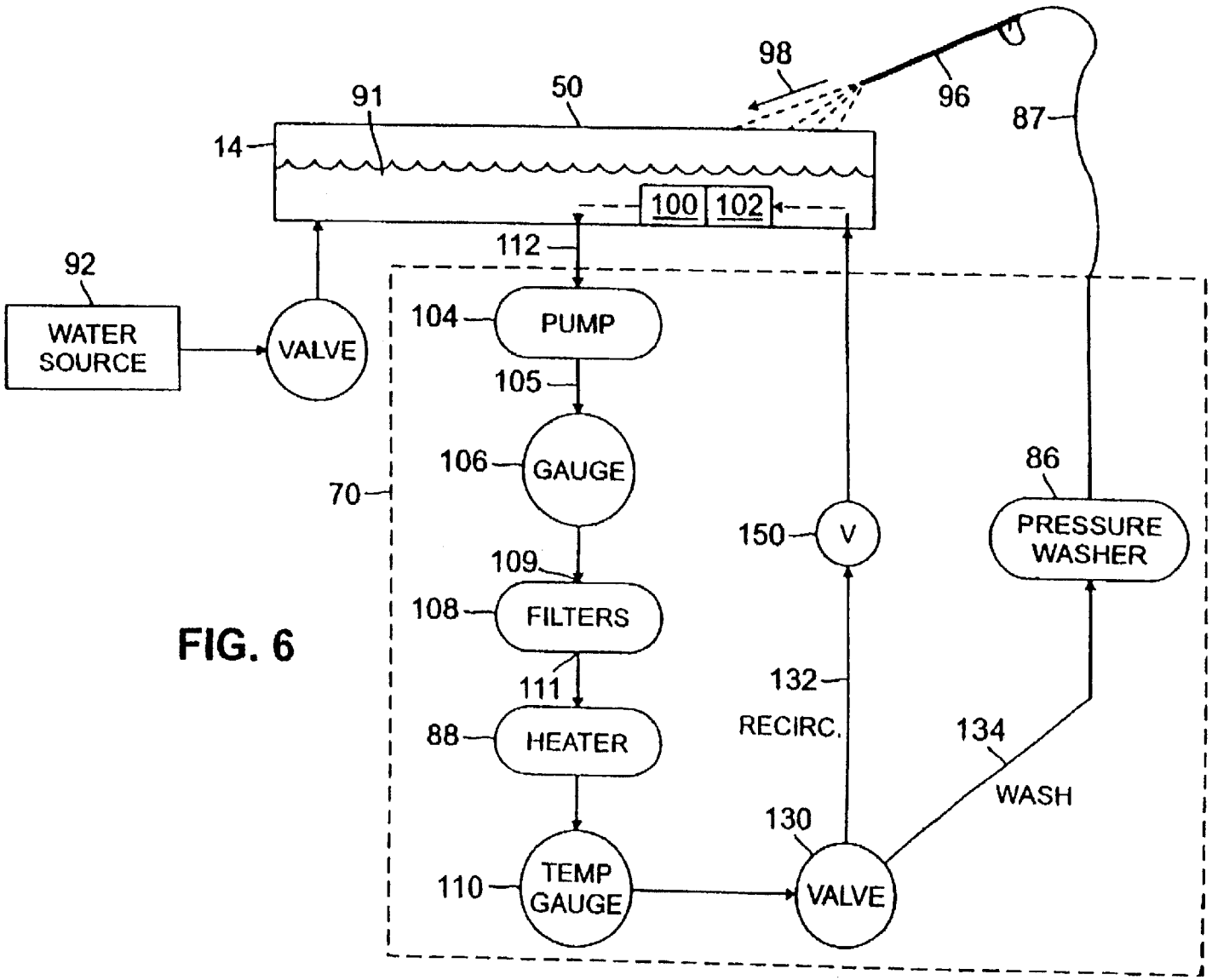
FIG. 6 is a schematic diagram of hydraulic components.
Figure 7:
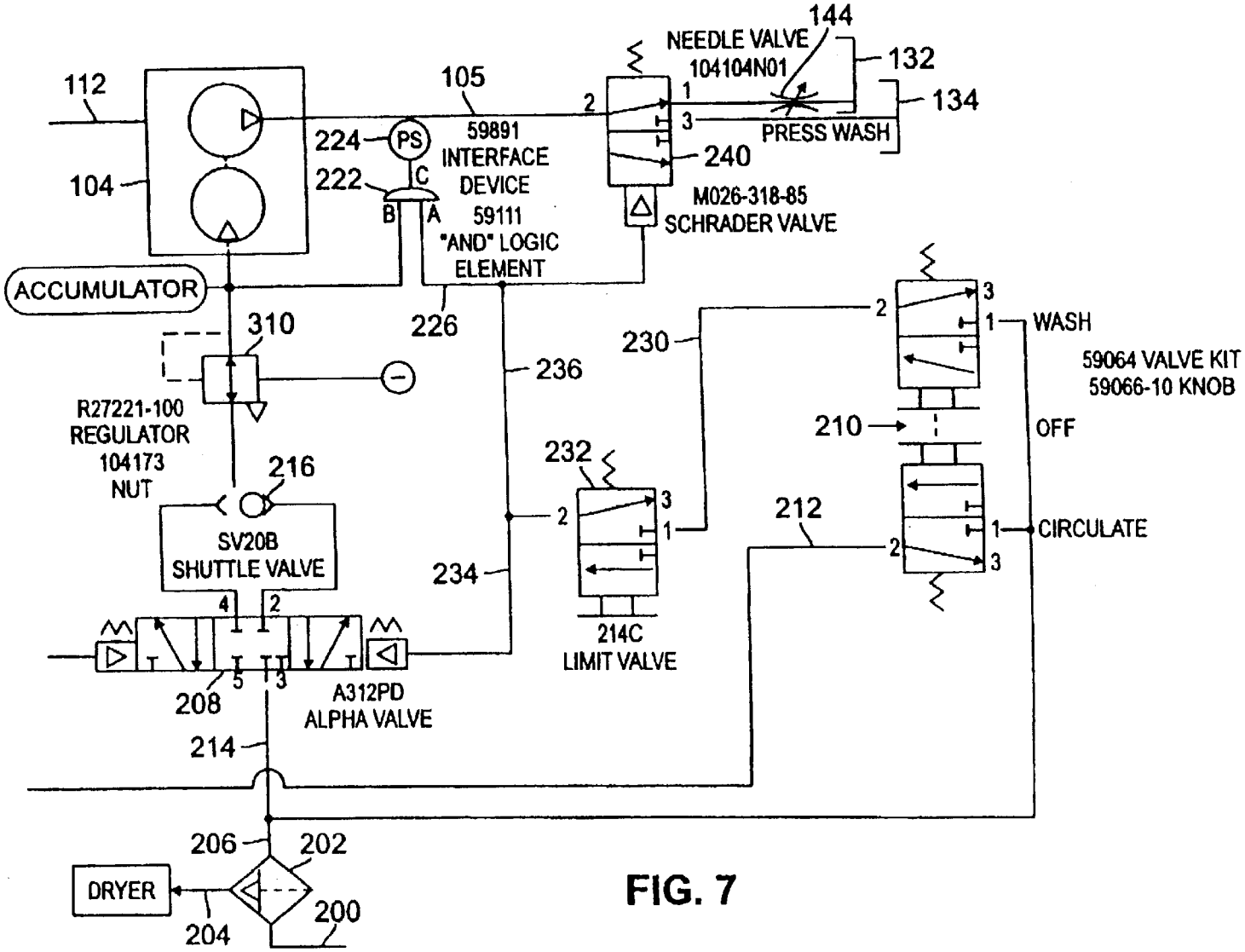
FIG. 7 is a schematic diagram of pneumatic components.

A control unit 70 is attached to the rear wall frame, and encloses control equipment described below. The control unit 70 is removable and may be attached to an enclosure of any dimension suitable for a particular object to be washed. For example, the enclosure and tub may take the form of an elongated rectangle to accommodate a motorcycle. When the control unit is removed it can be stacked on the collapsed frame of the apparatus for compact shipment. The particular dimensions and structure of the control unit 70 are not critical, and it can be made using a frame 72 of aluminum tubing, fiberglass, or an equivalent. The control unit 70 has a rear wall 74 and a floor 76 to which the components shown in FIGS. 5, 6, and 7 are mounted. These components need not be mounted in any particular place within the control unit 70. A control panel 78 provides a mounting surface for gauges, control knobs, and dials.

FIG. 6 shows the hydraulic system, that is, components and paths used to move water through the apparatus. In the description of this system, the term "water" is used to refer to a washing agent used to wash contaminants from an object. However, detergents or other suitable washing agents may be used; the invention is not limited to water as a washing agent.

The mechanical flow of water through the tub is shown in FIG. 4, in which the arrows represent the direction of water flow. For clarity, in the following discussion, aspects of the invention shown in FIG. 4 and FIG. 6 are discussed together for clarity.

Initially, the tub 14 is filled with water 91 to a predetermined depth, such as about 7" (18 cm), to prime the system and ensure proper pump operation and proper filtration. As described above, beams 40, 42 rest in the tub 14, and fit snugly against one another to form a plurality of dammed containment compartments A, B, C, D, E, F, G, H, J. As shown in FIG. 6, a pressure washer 86 provides a flow of high-pressure water through a hose 87 to a wand 96. The wand is swept over the object to be washed, causing water to cascade onto the subfloor 50, as indicated by arrow 98. The water only enters compartments A, B, C, D, E and F because the gaps in the subfloor are provided only at the sides and front of the subfloor. Also, water cannot flow laterally through beams 40 except through gaps 114 which lead to compartment F.

A pipe 112 is provided at the rear of the tub and is coupled to a first pump 104 which draws water 91 from the tub 14 through the pipe 112. The pipe 112 has a pick-up screen covering its open end in the tub 14 to prevent large particles from entering the pump 104. In operation, the pump provides continuous suction through the pipe 112. As a result, when an object is being washed, runoff water and contaminants (that is, a contaminated slurry flow) will initially enter compartments A, B, C, D, and E. In these compartments, the water tends to swirl around, as shown by the arrows, until it exits the compartment through gaps 43 at the ends of the beams 42. Each beam tends to act as a vertical weir to enhance breakdown of suspended solids, which fall to the bottom.

Eventually the water/contaminant slurry moves into compartment F through the gaps 114. Holes 118 permit suction from the pump 104 to draw the water through a first water/oil separator 100 in compartment G. A plurality of holes 118 are provided to conform to inlet points of the separator 100. As shown by the arrows in compartment G, the separator permits cleaned slurry water to flow toward the outlet pipe 112, but oil and other contaminants rise to the surface of the separator and are discharged to its sides, falling into a pair of capillary absorbent "socks" 116 or equivalent. The socks absorb many times their weight in oil and other contaminants through capillary action. Heavy particles fall out of the separators and settle to the floor of the tub.

Suction from the pump further urges cleaned water exiting separator 100 to flow into separator 102, in compartment H, in which the oil/water separation process is repeated. More oil or contaminants rise in the separator and are discharged into another pair of absorbent socks 116. Separated water flows into a clean water compartment J and through outlet pipe 112. The outlet pipe 112 is mounted at a low position in the rear-most beam 42, so that any residual oil floats and is not drawn into the outlet pipe 112.

At this point, the cleaned water is drawn by the pump 104 and driven under pressure through a hose 105 to a pressure gauge 106 which can be mounted on the control panel 78. Thus, the gauge reads the output pressure of the pump 104.

The water next moves through at least one filter 108 having an intake 109 and an outlet 111. More filters can be used to remove successively smaller particulates and molecules from the water. For example, filter 108 can comprise a 150 micron to 100 micron filter, series coupled to a 100 micron to 30 micron string-wound filter, series coupled to a 30 micron to 10 micron polypropylene filter. The filters can be arranged to perform coalescing filtration by routing unfiltered water into the center of the filter and drawing filtered water out the sides of the filter.

The number of filters can be varied without affecting the scope of the invention. The filters may comprise string-wound or pleated cellulose or polypropylene filter cartridges such as those available from Met Pro Corporation, Keystone Filter Division, Hatfield, Pa. USA.

The difference in pressure displayed by a water gauge 106 and an air gauge (in the pneumatic system described below) represents the restriction imposed by the filters, and line friction in the water hoses, tub, and piping. Typically, the restriction will be about 15–20 PSI for clean filters, depending on the filtration capacity and type of filters. The gauges can be used to judge when the filters are dirty by observing a change in the pressure difference or restriction; when the restriction increases 8–10 PSI, the filters should be changed.

Filtered water exiting the filter outlet 111 is fed to a heater 88 which heats the water to a pre-determined temperature, such as 140–180 degrees F. Water at this temperature has markedly improved cleaning effectiveness. The heated water passes through a temperature gauge 110, such as a sight-glass type, which enables an operator to read the temperature of the heated water and also verify the clarity of the filtered water. Heating a loaded tub 14 of cold water can take several hours. Therefore, the apparatus can include a digital clock coupled to the apparatus for turning the entire apparatus on, in recirculation mode, to pre-heat the water starting several hours before an operator begins work with the apparatus.

Upon exiting the temperature gauge 110, the water arrives at a valve 130 having two output paths 132, 134. The valve 130 can be, for example, a three-way Schrader air-actuated valve. Under pneumatic control, as discussed below, the valve 130 may be set for output on a recirculating path 132 or a wash path 134. When the recirculating path 132 is selected, water flows back to the tub 14 for re-use. Thus, path 132 enables the apparatus to operate in a closed manner with zero discharge of filtered water. This ensures that any remaining toxins stay within the system and do not enter groundwater or a storm drain system. It also improves the efficiency of the separation process by forcing water into the A compartments of the tub, i.e., at the beginning of the compartment circulation cycle. In addition, the recirculation path 132 returns filtered water to the tub for re-use, which greatly reduces the quantity of wastewater. The filtered water can be left in the tub with any residual contaminants. The contaminants may then be wiped or vacuumed out of the tub and disposed of, resulting in virtually zero wastewater discharge. Other containments are trapped in the capillary socks, which are disposable.

When the wash path 134 is selected, the valve 130 routes heated water to a second pump such as the pressure washer 86 which generates high-pressure water to a manually operated washing wand 96. A separate flow of detergent or washing chemicals can be routed through the wand.

Under certain conditions it is desirable to adjust the flow rate of water leaving the pump. For example, chemical washing agents or detergents in the apparatus may change the thermal conductivity or specific heat of the water, requiring reduced flow through the heater to heat the water sufficiently. Therefore, a manually adjusted flow control valve 150 is provided to regulate the flow rate of the water after it leaves the pump.

An external water source 92 such as a faucet or hose can be separately coupled to the tub 14 through a differential pressure valve 120, to provide fresh make-up water for replacement of tub water lost through evaporation. In this arrangement, the valve is submerged in the tub and senses water pressure above the valve. When the pressure decreases to a predetermined threshold which indicates a low water level, the valve opens, permitting make-up water to enter and fill the tub. This is helpful since use of heated water in the system increases the rate of water lost to the atmosphere through evaporation.

The number of separators and capillary socks can be varied depending on the level of contamination of the objects to be washed. Thus, the system can be tailored to match cleaning needs of a particular object or industry. The pump may comprise an ARO 66602x series ¼" port air-operated diaphragm pump available from ARO Fluid Products Division, Bryan, Ohio USA. An air-operated pump is advantageous to reduce the likelihood of igniting flammable contaminants, and to prevent electric shock. A diaphragm pump is advantageous because it has no impeller which can break. Some air-operated pumps also are groundable, which helps dissipate static electricity charges which may build up during washing.

The oil-water separators may comprise MPAK coalescing plate separators available from Facet International, Inc., Tulsa, Okla. USA. The absorbent socks may comprise SPILCAT capillary absorbents available from HYTEC Environmental Equipment, Walnut Creek, Calif. USA.

FIG. 5 shows electrical connections. In general, the electrical system is minimized to reduce the potential for igniting combustible materials washed from an object and to reduce shock hazard. A plug 80 is coupled to a source of alternating current at 120 volts a.c. or 220 volts a.c. A main power switch 82 enables disconnection of the power. Preferably the circuit is protected by a high-current (80 ampere) ground fault circuit interrupter 84 such as Leviton Cat. No. 6895. Three devices are connected across the voltage source. An electric pressure washer 86 uses the a.c. current to generate a high-pressure stream of fluid, such as water, from a low-pressure input stream. The heater 88 heats the fluid to improve washing effectiveness. The heater 88 may comprise a 3000-watt hot tub/spa heater such as model HTTR, HTHX, or STX available from Vulcan Electric Co., Kezar Falls, Me. USA. An hour usage counter 90 enables an operator to monitor the amount of time for which the apparatus has been used.

When the tub 14 contains a large volume of cold water, heating the entire volume to a temperature sufficient for improved cleaning may take several hours. The water can be pre-heated automatically, before an operator arrives for a work session, with a programmable clock. A suitable clock is the type used to control spa heaters, such as those made by BRK Industries, within a 30-amp current switching load, and an override feature. The clock comprises a digital clock module coupled to a solenoid-driven air valve, which is connected in series with the air pressure source 200 shown in FIG. 7. The current time of day is preset, and the desired start time is preset on the clock. At the preset time, the clock causes the solenoid to open the valve. The system is left in circulate mode while the clock is running. Thus, when the preset time arrives, the clock will open the valve and permit air to activate the system, turning on water circulation and the heater.

The apparatus is controlled using a pneumatic control and signaling system as shown in FIG. 7. Pneumatic signaling is superior to an electrical system because it is simpler, offers greater fire safety, and reduces the risk of electric shock. The latter advantage is important because the entire apparatus, including the control unit 70, may get wet during the washing process.

An air pressure source 200 feeds the system, preferably at about 40 PSI to 100 PSI, from an external compressor or compressed gas bottle. Air is coupled to a quick-disconnect coupling 202. One branch of the coupling feeds an external dryer wand. The wand may be used to blow-dry the washed object.

The other branch 206 of the coupling 202 is coupled to an alpha valve 208 and to a rotary control valve 210. The control valve 210 has three settings: off, wash, and circulate. In the off setting, air is disconnected and the system does not operate. In the circulate setting, the system will circulate water, but the pressure washer does not operate, so objects cannot be washed. In the wash setting, only the pressure washer operates.

When the control valve 210 is in the circulate setting, the control valve routes an air signal 212 to the alpha valve 208, which opens, permitting air to flow on path from path 214 to a shuttle valve 216. Air then enters a flow regulator 310. The regulator 310 may be manually adjusted to vary air pressure downstream from the regulator 310 which drives the pump 104. The pump 104 outputs water at the same pressure as the input air pressure. Thus, by adjusting the regulator 310, an operator can change the water flow rate of the pump 104.

Air exiting the regulator 310 is also coupled to an AND logic device 222. As described above in connection with FIG. 6, the pump 104 receives input water from the tub 14 through pipe 112, and passes water out on line 105. A pressure sensor 224 is coupled to the AND device 222, and is located adjacent to the water line 105. The AND device turns ON only when sufficient air pressure in line 226 is sensed by the pressure sensor. This acts as a safety mechanism, keeping the air pump 104 from running with zero or insufficient air pressure, and thus preventing the apparatus from feeding a "dry line" to the pressure washer 86.

After exiting the AND device, air is fed to the Schrader valve 240. Thus, when the control valve 210 is in the recirculate position, and sufficient water pressure exists in line 105, the Schrader valve moves, causing water to pass from line 105 through a needle valve 144 to the recirculation path 132.

When the control valve 210 is in the wash position, an air signal is fed on line 230 to a limit valve 232. The limit valve 232 is mounted adjacent to the ramp 62; if the ramp is closed, the limit valve feeds air to the alpha valve 208, which then opens. This prevents an operator from washing a contaminated object until the ramp is up and the object is fully contained by the apparatus. The limit valve also feeds air on line 236 to the AND logic element 222 and to the Schrader valve 240. When the Schrader valve is activated, it permits a flow of water to enter the pressure washer via wash path 134. Thus, when the control valve is in the wash position, and the ramp is closed, the pneumatic system activates the pressure washer. The limit valve 232 does not shut off the air signal 212 when the control valve 210 is in the circulate position; thus, water can circulate in the tub when the ramp is down, because this does not pose a safety risk to the operator or the environment.

Figure 8:
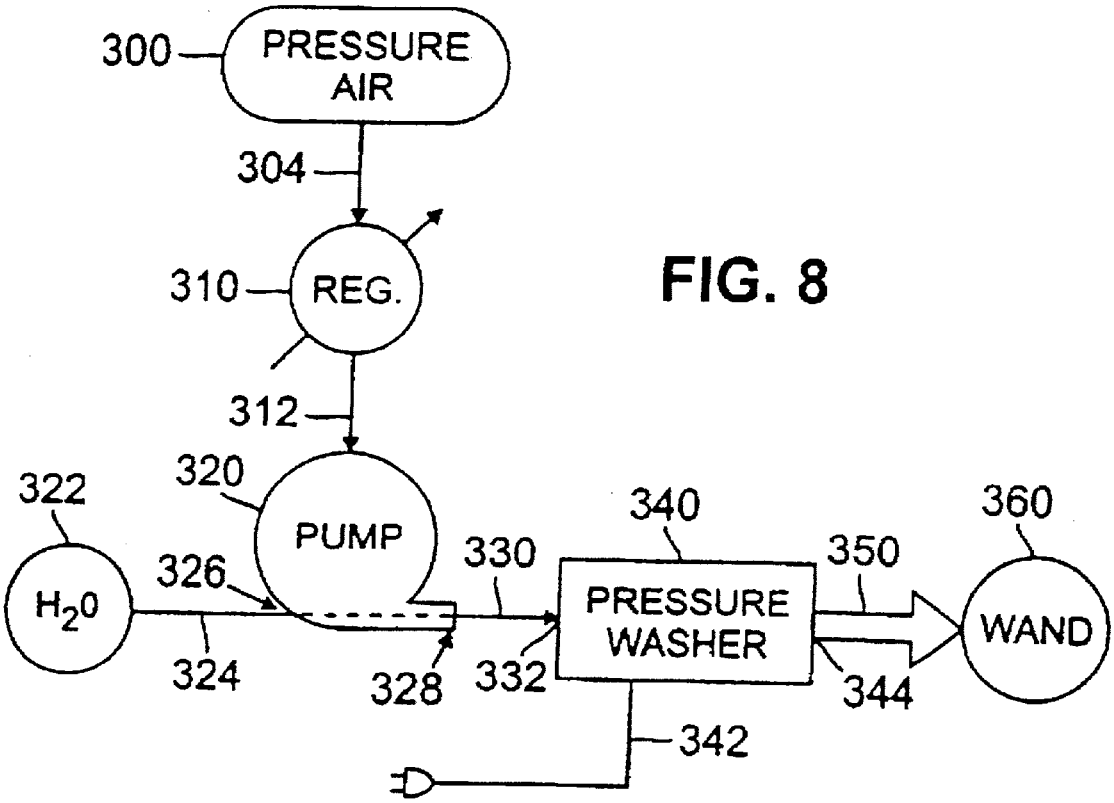
FIG. 8 is a block diagram of a way of optimizing performance of a fluid pump.

The apparatus described above incorporates a significant advance in the art of pump performance. FIG. 8 shows a way to optimize the performance of a fluid pump 340 such as a pressure washer. A source of a first fluid under pressure 300 is provided, which may comprise an air compressor, air from a compressed-gas bottle, or the equivalent. Generally the pressure of the fluid source 300 is about 40 pounds per square inch (PSI) to 100 PSI. The pressurized fluid is coupled on a supply line 304 to a regulator 310, such as a manual dial-operated air regulator. The regulator 310 provides air at manually-variable pressure on an output line 312.

The output line 312 is coupled to a second pump 320 which drives a second fluid. The second pump 320 has a supply port 326 for receiving a flow of a second fluid, such as a water supply 322, on a supply line 324. The second fluid is impelled through the second pump and exits through an output port 328 at higher pressure. The second pump can be, for example, an air-operated diaphragm-type pump. This type of pump requires no electricity, so it is safe for use in pumping flammable fluids. The output water pressure of a diaphragm pump is determined by the magnitude of the input air pressure.

The higher pressure output port 328 is coupled on a fluid line 330 to the input port 332 of the fluid pump 340. The fluid pump may be, for example, a pressure washer, which is essentially a high-performance electric water pump. An external electricity supply is provided to the fluid pump 340 by a line cord 342, and powers an electric motor in the fluid pump. The fluid pump produces a high-pressure output stream 350 through a pressurized output port 344. The stream 350 can be coupled to a pressure wash wand to direct the stream onto an object to be washed.

Ordinarily, a fluid pump 340 such as a pressure washer is not coupled to another pump, but is simply connected to a water supply using a hose. Water supplies vary widely in average pressure and instantaneous pressure, so that a particular pressure washer will operate with different efficiency and reliability depending on the quality and consistency of the water source. Indeed, if the water supply is excessively low in pressure, the pressure washer will run in a "starved" condition; the electric motor must work much harder to impel a low-pressure input stream than a higher-pressure input stream for a given output pressure. This generally increases current consumption and significantly shortens the life of the pump motor and internal components of the pump. Since high-quality pressure washers are quite expensive, early failure of the motor and/or pump can be catastrophic.

The way of controlling a pump described above overcomes these problems. By adjusting the regulator 310 to vary the output pressure of the second pump 320, the input stream 330 to the fluid pump 340 can be precisely controlled or "tuned," so that the pump 340 runs under optimum conditions. After the system is running and the pump 340 is generating a high-pressure stream 350, the operator can listen to noise made by the pump 340 and manually adjust or tune the regulator 310 to avoid starving the pump 340. An experienced operator can hear variations in the sound of the pump which indicate stress or non-optimum performance. The operator can also observe gauges showing the pressure in line 312 and line 330 and adjust the pressure in line 330 to a pressure recommended by the manufacturer of the pump 340.

Alternatively, to assist an operator in judging an optimum setting for the regulator 310, a pressure switch is placed in line 330. The pressure switch also protects the heater by shutting it off when insufficient water pressure is present. An electric lamp coupled to the switch glows when sufficient water pressure is present and the heater is on. The pressure switch is preset to turn on at a line pressure which is known to represent ideal input pressure for the fluid pump 340. In this arrangement, an operator can adjust the regulator 310 until the lamp glows. Thus, the lamp provides a visual indication that optimum input water pressure is being provided to the pump 340.

The components shown in FIG. 1–7 may also operate according to the optimization scheme shown in FIG. 8 and described above. When the control valve 210 is in the wash position, an operator can adjust regulator 310 to provide optimum airflow to pump 104, which generates an output stream of water on line 105 at constant and reliable pressure. This stream feeds the pressure washer 86; thus, by adjusting regulator 310 an operator can quickly and precisely tune and optimize the performance of the pressure washer.

The invention is not limited to the specific embodiments described above.

What is claimed is:

1. Apparatus for washing an object having a contaminant and for recovering the [containinant] *contaminant*, comprising:

a floor to support said object;

means for flowing a washing agent over said object;

a basin mounted below said floor for receiving said washing agent and said contaminant, the basin including a plurality of baffle walls to define a plurality of outer chambers positioned at the edges of the basin and at least one inner chamber surrounded by the outer chambers, the floor having at least one channel for directing said washing agent and contaminant into the outer chambers;

means for circulating a slurry of said washing agent and said contaminant from the outer chambers to the inner chamber;

at least one contaminant separator located in the inner chamber of said basin;

means for filtering the contaminant in said slurry to produce a cleaned slurry flow; and means for recirculating the cleaned slurry flow into one of the outer chambers of said basin.

2. An apparatus for washing an object having a contaminant and for recovering the contaminant, comprising:

means for flowing a washing agent over said object, wherein said means for flowing includes a fluid pump having a supply port and a pressurized output port;

means for optimizing performance of said fluid pump, wherein said means for optimizing includes a pressurized supply of a first fluid, a variable regulator coupled to said pressurized supply having a variable pressure output, and a second pump driven by said variable pressure output for impelling a second fluid into said supply port of the fluid pump;

a basin mounted below said object for receiving said washing agent and said contaminant;

means for circulating a slurry of said washing agent and said contaminant through at least one contaminant separator in said basin;

means for filtering the contaminant in said slurry to produce a cleaned slurry flow; and means for recirculating the cleaned slurry flow into said basin.

3. The apparatus of claim 1, wherein said means for filtering includes a pump having an intake coupled to the inner chamber of said basin and having an output coupled to at least one filter.

4. The apparatus of claim 1, wherein said means for circulating includes a pump, the inner chamber in said basin coupled to an intake of said pump and one of the outer chambers in said basin coupled to an outlet of the pump, at least one other fluid containment chamber in said basin, and a plurality of gaps interconnecting said chambers.

5. The apparatus of claim 4, wherein said means for recirculation includes a filter output coupled to a pneumatic valve for selectively coupling said filter output to one of the outer chambers.

6. The apparatus of claim 1, further comprising means for enclosing said object to prevent discharge of said contaminant into a surrounding environment.

7. The apparatus of claim 1, further comprising means for warming said washing agent.

8. The apparatus of claim 1, wherein said means for flowing a washing agent includes a pressure washer.

9. The apparatus of claim 1, wherein said separator further comprises an absorbent sock.

10. The apparatus of claim 2, wherein said first fluid is a gas and said second fluid is a liquid.

11. The apparatus of claim 2, wherein said first fluid is air and said second fluid is a washing agent.

12. The apparatus of claim 2, wherein said fluid pump is a pressure washer.

13. The apparatus of claim 2, wherein said second pump is an air-driven water pump.

14. Apparatus for recovering contaminants from an object, comprising:

a floor to support said object;

means for washing said object;

a tub mounted in an enclosure around said object beneath said floor and comprising a plurality of outer fluid containment compartments positioned at the edges of said tub and at least one inner fluid containment compartment surrounded by said inner compartments;

a circulating pump having an intake coupled to the inner compartment and having an output coupled to one of the outer compartments;

a [containment] *contaminant* separator in said tub having a separation intake coupled to said one of said outer compartments and having a separation output coupled to the inner compartment; and a filter having a filter intake coupled to the inner compartment and having a filter output coupled to one of said outer compartments of said tub.

15. An apparatus for recovering contaminants from an object, comprising:

a tub mounted in an enclosure around said object and comprising plurality of fluid containment compartments;

a circulating pump having an intake coupled to a first compartment and having an output coupled to a second compartment;

means for washing said object, wherein said means for washing includes a fluid pump having a low-pressure intake coupled to said output of said circulating pump and having a high-pressure output;

means for optimizing performance of said fluid pump, wherein said means for optimizing includes a pressurized supply of a first fluid, a variable regulator coupled to said pressurized supply having a variable pressure output, and a second pump driven by said variable pressure output for impelling a second fluid into said low-pressure intake of the fluid pump;

a [containment] *contaminant* separator in said tub having a separation intake coupled to said second compartment and having a separation output coupled to a third compartment; and a filter having a filter intake coupled to said third compartment and having a filter output coupled to said tub.

16. The apparatus of claim 15, wherein said tub further comprise a floor having at least one channel for directing said washing agent and contaminant into said compartments.

17. The apparatus of claim 15, wherein said means for filtering said contaminant comprises said second pump with an intake coupled to said basin and with an output coupled to at least one filter.

18. The apparatus of claim 15, wherein said means for circulating a slurry of said washing agent comprises:

said second pump;

a first fluid containment chamber in said tub coupled to an intake of said second pump;

a second fluid containment chamber in said tub coupled to the outlet of said second pump;

at least one other fluid containment chamber in said tub; and a plurality of gaps interconnecting said fluid containment chambers.

19. The apparatus of claim 15, wherein said means for recirculating comprises:

a filter output coupled to a pneumatic valve for selectively coupling said filter output to the tub.

20. The apparatus of claim 15, wherein said separator further comprises an absorbent sock.

21. The apparatus of claim 15, wherein said first fluid is a gas and said second fluid is a liquid.

22. The apparatus of claim 15, wherein said first fluid is air and said second fluid is a washing agent.

23. The apparatus of claim 22, further comprising means for warming said washing agent.

24. The apparatus of claim 15, wherein said second pump is a air-driven water pump.

25. The apparatus of claim 15, wherein said fluid pump is a pressure washer.

26. Apparatus for washing an object containing a contaminant and for recovering the contaminant, comprising:

a pressure washer for flowing a washing agent over said object;

a tub mounted below said object comprising a plurality of baffles defining a plurality of fluid containment compartments;

a circulating pump having an intake coupled to a clean water compartment in said tub, and having an output coupled to one of said compartments;

a contaminant separator in said tub having a separation intake coupled to one of said compartments and having a separation output coupled to said clean water compartment;

a filter having a filter intake coupled to said clean water compartment and having a filter output coupled to said tub; and means for optimizing performance of said pressure washer, comprising a pressurized supply of air; a variable regulator coupled to said air having a variable pressure air output; and a second pump driven by said variable pressure air output for impelling water into said pressure washer.

*27. A self-contained portable recycling pressure washing system comprising:*

*a floor suitable for supporting an object to be pressure washed and that includes one or more gaps through which a washing agent may drain;*

*a pressure washing apparatus suitable for flowing the washing agent over the object in a pressurized stream;*

*a basin mounted below the floor for collecting washing agent that is flowed over the object;*

*a plurality of spaced-apart load-bearing longitudinal and lateral beams disposed in a grid within the basin; and*

*a filter arrangement for filtering the washing agent collected by the basin, wherein filtering agent is re-circulated to the pressure washing apparatus.*

*28. A self contained portable recycling pressure washing system as recited in claim 27 further comprising walls arranged to help contain the washing agent flowed over the object and wherein the floor is sized suitably for receiving objects at least as large as an automotive engine.*

*29. A self contained portable recycling pressure washing system as recited in claim 27 further comprising a heater for heating the washing agent.*

*30. A self contained portable recycling pressure washing system as recited in claim 29 wherein the pressure washing apparatus includes a pump for pressurizing the washing agent and a wand for flowing the pressurized washing agent over the object.*

*31. A self contained portable recycling pressure washing system as recited in claim 27 wherein the floor, the pressure washing apparatus, the basin, and the filter are all mounted as a single unit.*

*32. A recycling pressure washing system comprising:*

*a floor suitable for supporting an object to be pressure washed, wherein the floor is sized suitably for receiving objects at least as large as an automobile engine and that includes one or more gaps through which a washing agent may drain;*

*a pressure washing apparatus suitable for flowing the washing agent over the object in a pressurized stream;*

*a basin mounted below the floor for collecting washing agent that is flowed over the object, wherein the floor and the basin are part of a transportable unit;*

*a plurality of spaced-apart load-bearing longitudinal and lateral beams disposed in a grid within the basin;*

*a filter arrangement for filtering the washing agent collected by the basin; and*

*wherein the pressure washing apparatus is arranged to re-circulate the filtered washing agent.*

*33. A transportable recycling containment system for use with a pressure washer comprising:*

*a floor suitable for supporting an object to be pressure washed, wherein the floor is sized suitably for receiving objects at least as large as an automobile engine and wherein the floor includes one or more gaps through which a washing agent may drain;*

*a basin mounted below the floor and that is larger in at least one dimension than the floor for collecting the washing agent that is flowed over the object, wherein the floor and the basin are part of a transportable unit;*

*a plurality of spaced-apart load-bearing longitudinal and lateral beams disposed in a grid within the basin; and*

*a filter arrangement for filtering the washing agent collected by the basin to provide a recirculated source of*

*washing agent for the pressure washer, wherein the transportable, recycling containment system is arranged to facilitate recirculation of the filtered washing agent to the pressure washer.*

*34. A transportable recycling containment system as recited in claim 33 further comprising:*

*walls arranged to help contain the washing agent flowed over the object; and*

*a heater for heating the washing agent.*

*35. A transportable recycling containment system as recited in claim 34 wherein:*

*the pressure washing apparatus further includes a pump for pressurizing the washing agent and a wand for flowing the pressurized washing agent over the object; and*

*the floor, the pressure washing apparatus, the basin and the filter are all mounted as a single transportable unit.*

*36. A self-contained portable recycling pressure washing system comprising:*

*a floor suitable for supporting an object to be pressure washed;*

*a pressure washing apparatus suitable for flowing a washing agent over the object in a pressurized stream;*

*a basin mounted below the floor for collecting washing agent that is flowed over the object, the basin including one or more outer chambers positioned at respective edges of the basin and at least one inner chamber surrounded by the outer chambers;*

*means for filtering the washing agent collected by inner chamber of the basin; and*

*means for re-circulating the filtered washing agent into one of the outer chambers of said basin.*

*37. A self-contained portable recycling pressure washing system comprising:*

*a floor suitable for supporting an object to be pressure washed;*

*a pressure washing apparatus suitable for flowing a washing agent over the object in a pressurized stream;*

*a basin mounted below said floor for receiving said washing agent and a contaminant, the basin including a plurality of baffle walls to define a plurality of outer chambers positioned at respective edges of the basin and at least one inner chamber surrounded by the outer chambers, the floor having at least one channel for directing said washing agent and said contaminant into the outer chambers; and*

*a filter arrangement for filtering the washing agent collected by the basin, wherein the filtered washing agent is recirculated to the pressure washing apparatus.*

*38. Apparatus for washing an object having a contaminant and for recovering the contaminant, comprising:*

*means for supporting said object;*

*means for flowing a washing agent over said object;*

*means for receiving said washing agent and said contaminant, said receiving means including a means to define a plurality of outer chambers positioned at respective edges of said receiving means and at least one inner chamber surrounded by the outer chambers, said supporting means having at least one channel for directing said washing agent and contaminant into the outer chambers;*

*means for circulating a slurry of said washing agent and said contaminant from the outer chambers to the inner chamber;*

*means for separating said contaminant located in the inner chamber of said receiving means;*

*means for filtering the contaminant in said slurry to produce a cleaned slurry flow; and*

*means for recirculating the cleaned slurry flow into one of the outer chambers of said receiving means.*

* * * * *

UNITED STATES PATENT AND TRADEMARK OFFICE

CERTIFICATE OF CORRECTION

PATENT NO. : RE 37,674 E
DATED : April 30, 2002
INVENTOR(S) : John A. Carter

It is certified that error appears in the above-identified patent and that said Letters Patent is hereby corrected as shown below:

Title page,
Item [73], delete "Assignee: John Carter, Grants Pass, OR (US)".

Column 14,
Line 22, replace "automotive" with -- automobile --.
Line 33, replace "filter are" with -- arrangement --.

Signed and Sealed this

Twenty-fourth Day of September, 2002

*Attest:*

*Attesting Officer*

JAMES E. ROGAN
*Director of the United States Patent and Trademark Office*